March 4, 1930.

S. T. HART

Re. 17,619

PRESSING MACHINE

Original Filed June 18, 1924 2 Sheets-Sheet 1

INVENTOR.
Simeon T. Hart
BY
Parsons & Bodell
ATTORNEYS.

March 4, 1930. S. T. HART Re. 17,619
PRESSING MACHINE
Original Filed June 18, 1924 2 Sheets-Sheet 2
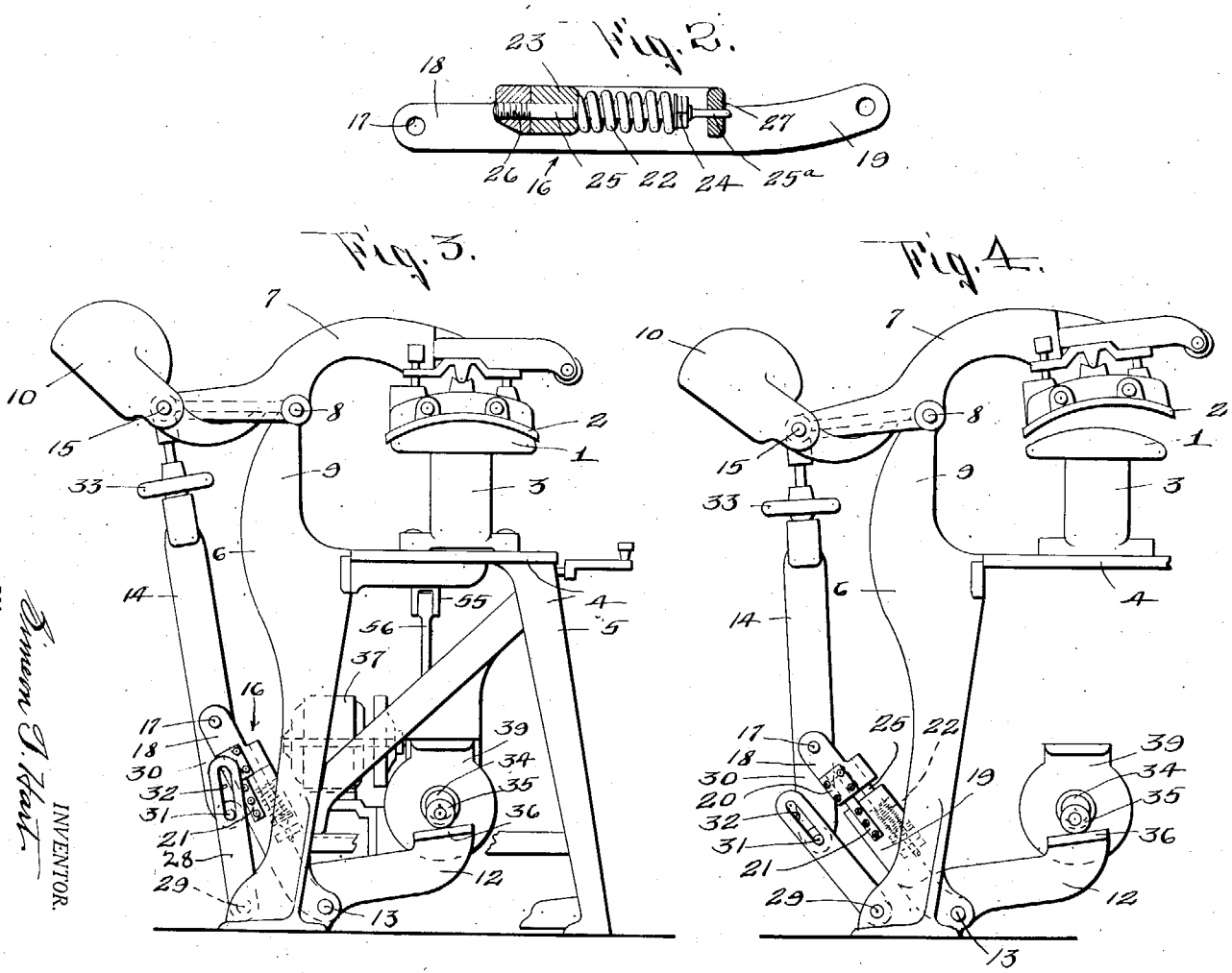
INVENTOR.
Simeon T. Hart
BY
Parsons & Bridell
ATTORNEYS.

Reissued Mar. 4, 1930

Re. 17,619

UNITED STATES PATENT OFFICE

SIMEON T. HART, OF SYRACUSE, NEW YORK, ASSIGNOR TO THE PROSPERITY COMPANY, INC., A CORPORATION OF NEW YORK

PRESSING MACHINE

Original No. 1,590,026, dated June 22, 1926, Serial No. 720,854, filed June 18, 1924. Application for reissue filed July 24, 1929. Serial No. 380,737.

This invention relates to presses, such as garment and laundry presses, and has for its object a particularly simple and efficient motion transmitting or toggle mechanism between the power lever and the movable element, or head of the press, by which mechanism the application of power to the press head can be effectively applied, only after a preliminary closing movement of the press head independently of the power mechanism, and by which shocks and jars and stalling and breaking of the machine is prevented in case the power is applied when the links are at or in the neighborhood of a dead center point, and also by which undue strains on the machine are prevented.

The invention consists in the novel features and in the combinations and constructions hereinafter set forth and claimed.

In describing this invention reference is had to the accompanying drawings in which like characters designate corresponding parts in all the views.

Figure 2 is a detail view of one of the links and the toggle.

Figure 1:
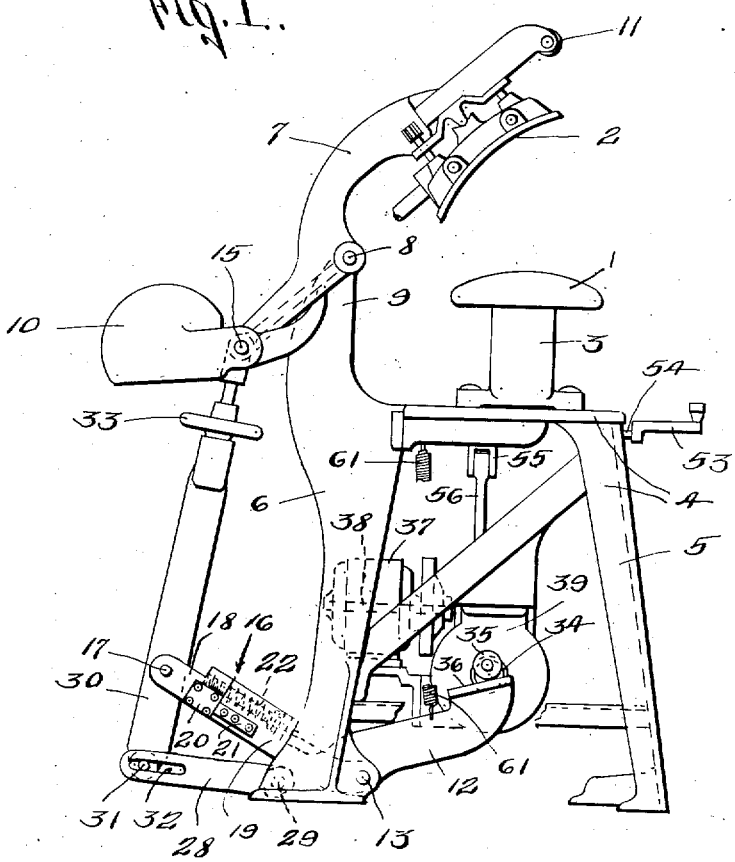
Figure 1 is a side elevation of the machine embodying my invention.

Figures 3 and 4 are views similar to Figures 1 and 2, part 3 being omitted, showing the position of the linkage when the machine is under final pressure and when the mechanism is at a neutral point.

This pressing machine comprises, generally, cooperating pressing elements one of which is movable toward and from the other, and actuating means therefor, including a power member, toggle links, one being connected to the movable element and the other to the frame independently of the power member, and the latter including endwisely movable sections, and a spring for resisting endwise movement of the sections, and a connection between the power member and the toggle normally arranged when the press is open, in ineffective position, and arranged to be moved to effective position by the preliminary closing of the press by the operator, independently of the power member.

I have here shown my invention as embodied in a standard form of garment and laundry press, comprising a stationary pressing element or buck 1, a movable pressing element or head 2 movable toward and from the buck 1, the buck 1 being mounted upon a bracket 3, which in turn is mounted upon the main frame 4.

The pressing elements and the frame may be of any suitable size and construction, the frame including legs or pedestals 5 and 6.

The head 2 is usually carried by a yoke or lever 7 pivoted between its ends at 8 to a standard 9, forming an extension of the rear leg 6 of the frame, the lever 7 extending forwardly and rearwardly and carrying the head 2 on its front arm, and a suitable counter weight 10 on its rear arm. The yoke 7 is also provided with a handle 11 at its front end by means of which the head is preliminarily moved toward closed position.

The power member is usually a lever 12 pivoted between its ends at 13 to the frame near the base thereof, and near or in the vertical line of the pivot 8, the power lever also extending forwardly and rearwardly.

14 is a toggle link pivotally connected to the head 2 through the lever 7, it being here shown as pivoted at 15 directly to the rear arm of the lever 7, and extending downwardly therefrom.

16 is a toggle link pivoted at one end at 17 to the link 14, and at its other end to the frame independently of the power lever, it being here illustrated as normally extending downwardly and forwardly from the link 14 when the press is open, and as pivoted on the same pivot 13 that the power lever 12 is mounted. This link 16 comprises endwisely movable sections 18 and 19, slidable relatively to each other, one section as 18 having a guide as a plate 20 on one side thereof, and the other having a complemental rib or guide 21 slidable in the guide 20. Endwise movement of the sections 18 and 19 is against the action of a compression spring 22, which thrusts at one end against the shoulder 23 on the section 19, and at its other end against a shoulder 24 on a rod 25 secured at 26 to the section 18 and extending through the shoulder 23 and through the spring 22, the rod 25 having its end 25[a] guided in a lug 27 on the section 19.

The connections between the power lever 12 and the toggle, comprises a link 28, pivotally connected to the rear arm of the power lever 12, and to the toggle, it being connected to one of the parts it connects by a lost motion connection, which is arranged to be taken up by the preliminary closing of the press head 2 independently of the lever 12, that is, a preliminary closing movement by the operator effected by pulling down on the handle 11. The link 28 normally extends rearwardly horizontally in the same general direction as the toggle link 16, so that, it will idle during the preliminary closing movement or will idle if power is applied to the lever 12 before or during such preliminary closing movement. Preferably the link 28 is pivoted at 29 to the rear arm of the power lever 12, and is connected to an extension 30 of the link 14 by a pin and slot connection, the pin 31 being provided on the link 14 below the joint 17 of the toggle, and the slot 32 being provided in the link 28. Owing to the relative arrangement of the links 16 and 28, the link 28 is carried into a straightened or effective position before the toggle links 14 and 16 are in an effective straightened position; and hence, when power is applied to the power lever 12 when the link 28 is in straightened position, the toggle links 14 and 16 will be moved further into effective straightened position and apply pressure to the press head. The arrangement of the links 14, 16 and 28 is such that the link 28 does not come into effective position until the head 2 has been preliminarily brought down to a position close to the work on the buck 1, that is, to what is called, a safety-first position.

The link 14 is provided with the usual adjustment for lengthening or shortening it to conform to the thickness of the work and the amount of pressure desired, and includes endwisely movable adjustable sections, which are adjusted by means of a wheel 33. As such adjustment by the wheel 33 is well known, further description is thought to be unnecessary.

In operation when the power lever 12 is depressed after the head has been preliminarily closed, the link 28 will cause the toggles 14 and 16 to move further toward their dead-center line and apply heavy pressure. In the event the lever 12 is depressed at any other time the link 28 will merely idle. If it is depressed when the head is but part way closed, the head 2 will open up under the influence of the weight 10, unless the operator is holding on to the handle 11. If this lever 12 is depressed when the links 14 and 16 are in a neutral point where the joint of the toggle will not move forwardly or rearwardly, the link 28 thrusting against or endwise on the link 14 owing to the pin 31 being at the inner or lower end of the slot 32, causes the sections of the link 16 to pull apart against the action of the spring 22 and thus avoid stalling of the machine, and the motor, burning out of the motor and fuses, or breaking of parts. These links 14 and 16 may come into such neutral point when the head has not been brought quite down to the position it is intended to be brought by the preliminary closing movement, and the extensible link 16 at all times prevents stalling of the machine or breaking of the parts in case the adjustment of the links 14 and 16 with respect to such neutral or dead-center point is not accurate. Owing to the links 16 no controlling means for preventing the operation of the head 2 is necessary.

The power lever 12 may be actuated in any suitable manner, and as here illustrated it is actuated by an intermittently movable shaft 34 having an eccentric or cam 35 thereof coacting with face 36 on the front end of the lever 12, the shaft 34 being intermittently actuated from a constantly running electric motor 37, the shaft 38 of which is connected to the shaft 34 through suitable gearing and intermittent clutch mechanism located within the housing 39.

The clutch may be of the construction shown in Patent No. 1,599,115 to Albert B. Clisson granted September 7, 1926. The clutch is controlled by a handle 53.

The lever 12 is caused to follow the cam by a suitable spring 61.

The construction and operation of the driving clutch mechanism forms no part of this invention, it being sufficient to bear in mind that the shaft 34 is intermittently movable and is connected to the power manually, and disconnected automatically at the end of each half revolution.

Assuming that the parts are in the position shown in Fig. 1, the operator first preliminarily closes the press, then operates the handle 53 causing the shaft 34 to make a half revolution moving the eccentric 35 from its position shown in Fig. 1, through a half revolution, thus depressing the power lever 12 and applying pressure to the head 2. When the pressure has been applied as long as desired, the operator again presses the handle 53 causing the clutch mechanism to connect the shaft 34 to the driving mechanism during another half revolution until the eccentric 35 moves to its position shown in Fig. 1, and the parts are in their starting position.

What I claim is:

1. A pressing machine comprising a frame, cooperating pressing elements, one movable toward and from the other, and actuating means for the movable pressing element, comprising a power member, a toggle comprising links pivotally connected respectively to the movable element and to the frame independently of the power member, the latter comprising endwisely movable sections, and a spring for resisting such endwise movement, and a connection between the power member and the toggle normally arranged in ineffective position and movable into effective position by a preliminary closing movement of the movable element independently of the power member, said connection being connected to the toggle to move the toggle toward final straightened position and to extend the sectional toggle link against the action of its spring when the straightening movement of the toggle is obstructed before the toggle reaches its straightened position.

2. A pressing machine comprising a frame, cooperating pressing elements carried by the frame, a forwardly and rearwardly extending lever supporting the movable element, said lever being pivoted between its ends to the frame, a forwardly and rearwardly extending power lever pivoted between its ends to the frame below the power lever, a toggle comprising a link pivoted to the rear arm of the first lever and extending downwardly therefrom, and a second link pivoted to the first link and to the frame, and normally extending downwardly and forwardly from the first link, the second link comprising endwisely movable sections and a spring for resisting endwise movement of the sections, and a link pivoted to the rear arm of the power lever in the rear of the pivot of the second link, and to the first link below the joint of the toggle, it being connected to one of the parts it connects by a lost motion connection.

In testimony whereof, I have hereunto signed my name, at Syracuse, in the county of Onondaga, and State of New York, this 10th day of June, 1929.

SIMEON T. HART.